(12) United States Patent
Shasha et al.

(10) Patent No.: US 11,928,492 B2
(45) Date of Patent: Mar. 12, 2024

(54) ENFORCING QUALITY OF SERVICE IN A VIRTUALIZED STORAGE ENVIRONMENT

(71) Applicant: EMC IP Holding Company LLC, Hopkinton, MA (US)

(72) Inventors: Osnat Shasha, Holon (IL); Rivka Matosevich, Zichron Ya'acov (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 514 days.

(21) Appl. No.: 17/140,316

(22) Filed: Jan. 4, 2021

(65) Prior Publication Data

US 2022/0214900 A1    Jul. 7, 2022

(51) Int. Cl.
*G06F 9/455* (2018.01)

(52) U.S. Cl.
CPC .......... *G06F 9/45558* (2013.01); *G06F 2009/45562* (2013.01); *G06F 2009/45579* (2013.01)

(58) Field of Classification Search
None
See application file for complete search history.

(56) References Cited

U.S. PATENT DOCUMENTS

| | | | |
|---|---|---|---|
| 9,285,992 B2 * | 3/2016 | Forgette | G06F 3/0631 |
| 2013/0054890 A1 * | 2/2013 | Desai | G06F 3/0632 |
| | | | 711/E12.001 |

| | | | |
|---|---|---|---|
| 2017/0168739 A1 | 6/2017 | Don et al. | |
| 2019/0384514 A1 | 12/2019 | Yang et al. | |
| 2020/0356287 A1 | 11/2020 | Tylik et al. | |

OTHER PUBLICATIONS

Vmware, Inc. "vSphere Storage," Update 2, Aug. 15, 2020, 382 pages.

* cited by examiner

*Primary Examiner* — Lewis A Bullock, Jr.
*Assistant Examiner* — Melissa A Headly
(74) *Attorney, Agent, or Firm* — Ryan, Mason & Lewis, LLP

(57) ABSTRACT

Techniques are provided for managing quality of service (QoS) policies in a virtual storage environment. A data storage system receives a request from a host system to connect to a target virtual volume in a storage array of the data storage system, and determines a protocol endpoint which has an assigned QoS policy which corresponds to a QoS policy of the target virtual volume. The data storage system binds the target virtual volume to the protocol endpoint which is determined to have an assigned QoS policy which corresponds to the QoS policy of the target virtual volume, and sends a unique identifier of the protocol endpoint, which is bound to the target virtual volume, to the host system. The data storage system utilizes the protocol endpoint, which is bound to the target virtual volume, to handle data access requests received from the host system for accessing the target virtual volume.

20 Claims, 4 Drawing Sheets

ENFORCING QUALITY OF SERVICE IN A VIRTUALIZED STORAGE ENVIRONMENT

TECHNICAL FIELD

This disclosure relates generally to storage systems and, more specifically, to techniques for managing service levels in a virtual storage environment.

BACKGROUND

Distributed storage systems are implemented using a plurality of storage devices (e.g., storage arrays) which can reside on multiple storage nodes that are network connected using, e.g., a local area network or a storage fabric. Host systems utilize a distributed data storage system to store data in a redundant and resilient manner. In some computing environments, host systems implement virtual compute resources such as virtual machines to execute workloads. As is known in the art, virtual machines are computer software emulations of hardware computer systems, wherein virtual machines are typically created by and run on a hypervisor or virtual machine monitor that may also be referred to as a virtualization platform or virtualization environment. In a virtualized data environment, the storage nodes host storage virtualization software to implement a storage controller which creates virtual storage by pooling physical storage from a plurality of storage devices into a single logical storage device. In some systems, virtual volumes are used to integrate physical, non-volatile data storage into the virtualization environment. Some data storage systems expose virtual volumes as data storage objects to the virtualization environment, making it convenient for the virtual volumes to be consumed as virtual disks by virtual machines running in the virtualization environment.

Data storage systems typically implement a mechanism to monitor and manage storage performance for various storage objects or groups of hosts by leveraging a quality of service (QoS) feature. A QoS feature improves storage resource fairness between multiple storage objects or host groups by allowing policy-based performance goals to be configured on such storage object or host groups. A configured QoS policy can be used, for example, to enforce a maximum or a minimum I/O rate and burst on a specific storage object (e.g., I/O object, virtual volume, a consistency group of volumes, etc.) or group of hosts, and thereby deliver predictable performance in a more consistent way or mitigate a noisy neighbor by maintaining storage resource fairness between the storage objects or hosts/host groups. In a virtual storage environment that includes a significantly large number of storage objects (e.g., virtual volumes), the ability to efficiently manage multiple QoS policy instances, one for each storage object, can be problematic and require the consumption of an intensive amount of storage resources.

SUMMARY

Exemplary embodiments of the disclosure include methods for managing QoS policies in a virtual storage environment. In an exemplary embodiment, a data storage system receives a request from a host system to connect to a target virtual volume in a storage array of the data storage system. The data storage system determines a protocol endpoint which has an assigned QoS policy which corresponds to a QoS policy of the target virtual volume. The data storage system binds the target virtual volume to the protocol endpoint which is determined to have an assigned QoS policy which corresponds to the QoS policy of the target virtual volume, and sends a unique identifier of the protocol endpoint, which is bound to the target virtual volume, to the host system. The data storage system utilizes the protocol endpoint, which is bound to the target virtual volume, to handle data access requests received from the host system for accessing the target virtual volume.

Other embodiments of the disclosure include, without limitation, systems and articles of manufacture comprising processor-readable storage media, which are configured for managing QoS in a virtual storage environment.

DETAILED DESCRIPTION

Exemplary embodiments of the disclosure will now be discussed in further detail with regard to systems and methods for managing and enforcing QoS polices on a protocol endpoint level in a virtual storage environment. For purposes of illustration, exemplary embodiments will be described herein with reference to exemplary information processing systems which implement data processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
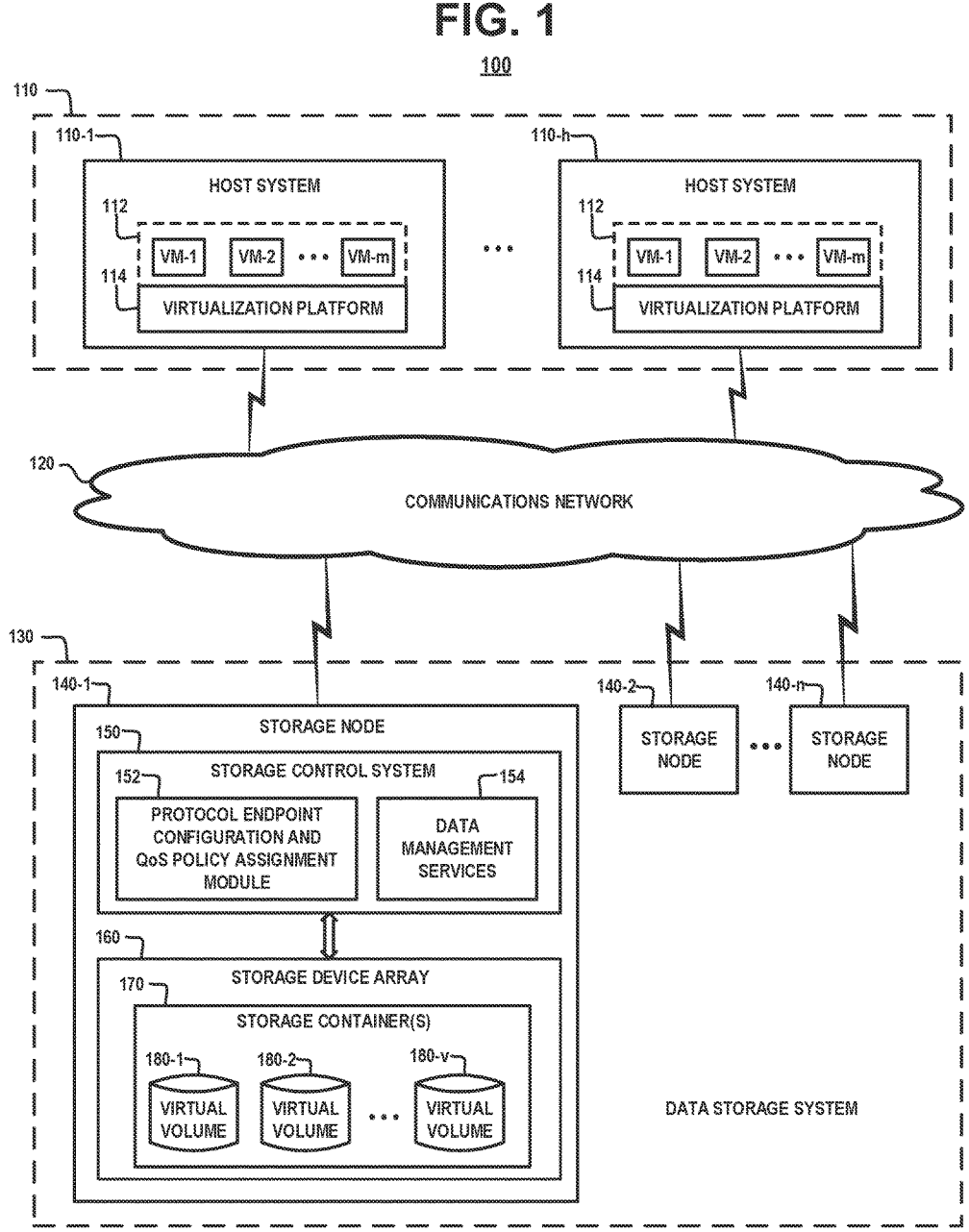
FIG. 1 schematically illustrates an information processing system which comprises a data storage system that is configured to manage QoS policies in a virtual storage environment, according to an exemplary embodiment of the disclosure.

FIG. 1 schematically illustrates an information processing system which comprises a data storage system that is configured to manage QoS policies in a virtual storage environment, according to an exemplary embodiment of the disclosure. In particular, FIG. 1 schematically illustrates an information processing system 100 which comprises one or more host systems 110-1, ..., 110-*h* (collectively, host systems 110), a communications network 120, and a data storage system 130. The data storage system 130 comprises one or more storage nodes 140-1, 140-2, ..., 140-*n* (collectively, storage nodes 140). The storage node 140-1 comprises a storage control system 150, and an array of storage devices 160 (or storage device array 160). In some embodiments, the other storage nodes 140-2 ... 140-*n* have the same or similar configuration as the storage node 140-1 shown in FIG. 1.

The host systems 110 comprise physical server nodes and/or virtual server nodes which host and execute applications that are configured to process data and execute tasks/workloads and perform computational work, either individually, or in a distributed manner, to thereby provide compute services to one or more users (the term "user" herein is intended to be broadly construed so as to encompass numerous arrangements of human, hardware, software or firmware entities, as well as combinations of such entities). In some embodiments, the host systems 110 comprise application servers, database servers, etc. The host systems 110 can include virtual compute nodes such as virtual machines and container systems. In some embodiments, the host systems 110 comprise a cluster of computing nodes of an enterprise computing system, a cloud-based computing system, or other types of computing systems or information processing systems comprising multiple computing nodes associated with respective users. The host systems 110 issue data access requests to the data storage system 130, wherein the data access requests (or I/O requests) include (i) write requests to store data in one or more of the storage nodes 140 and (ii) read requests to access data that is stored in one or more of the storage nodes 140.

In some embodiments, as shown in FIG. 1, each host system 110 comprises a plurality of virtual machines 112 (e.g., VM-1, VM-2, ..., VM-m) which execute on a virtualization platform 114 in the host systems 110. The virtual machines 112 are created and managed by the virtualization platform 114 using methods as discussed in further detail below. The virtualization platform 114 comprises one or more hypervisors or virtual machine monitors.

The storage control system 150 comprises a protocol endpoint configuration and QoS policy assignment module 152 and various modules to provide data management services 154. The storage device array 160 comprises one or more storage containers 170, wherein each storage container 170 is configured to store one or more virtual volumes 180-1, 180-2, ..., 180-*v* (generally denoted, virtual volumes 180). As explained in further detail below, each storage container 170 serves as a virtual volume store to store the virtual volumes 180, wherein the virtual volumes 180 within a given storage container 170 are allocated out of the capacity that is assigned to the virtual storage container from the physical capacity of the storage device array 160. The virtual volumes 180 comprise encapsulation of virtual machine files associated with the virtual machines 112. For example, the virtual volumes 180 include, e.g., virtual disk files (e.g., disk drive), configuration files (settings, configuration, state information, log files, etc.), and other types of files/objects, which are associated with the virtual machines 112.

The protocol endpoint configuration and QoS policy assignment module 152 implements methods for configuring logical I/O proxies, referred to herein as protocol endpoints. The protocol endpoints provide access points for communication between the host systems 110 and the data storage system 130. The protocol endpoints establish data paths on-demand from virtual machines to their respective virtual volumes 180, wherein I/O requests from the virtual machines 112 on a given host system 110 are communicated through the protocol endpoints to the virtual volumes 180 that are stored in the virtual storage containers 170 in the storage device array 160 of the storage nodes 140. A single protocol endpoint can multiplex I/O requests from a large number of virtual machines 112 to their respective virtual volumes 180. Protocol endpoints are automatically created when a host system is granted access to the virtual volume datastore. As explained in further detail below, the protocol endpoint configuration and QoS policy assignment module 152 implements a QoS management and enforcement platform in which QoS policies are enforced on a protocol endpoint (PE) level in the data storage system instead on each virtual volume, wherein a virtual volume level of control is implemented in which a virtual volume is bound to a protocol endpoint which is determined to have an assigned QoS policy which corresponds to the QoS policy of the virtual volume (e.g., which corresponds to a storage profile of a virtual machine associated with the virtual volume).

The data management services 154 are consumed by the virtual machines 112 running on the virtualization platforms 114 in the host systems 110. In some embodiments, the data management services 154 include various data management and storage functions and services implemented by the storage control systems 150 including, but are not limited to, configuring and provisioning the storage container 170 and virtual volumes 180 by aggregating/pooling storage capacity of the storage device array 160 on the storage nodes 140, performing functions such as inline data compression/decompression, deduplication, thin provisioning, and data protection functions such as data replication, snapshots, and other data protection schemes based on data striping and parity (e.g., RAID), and other types of data management functions, depending on the system configuration.

The communications network 120 is configured to enable the host systems 110 to communicate with the storage nodes 140 of the data storage system 130, as well as enable communication between the storage nodes 140 of the data storage system 130. In this regard, while the communications network 120 is generically depicted in FIG. 1, it is to be understood that the communications network 120 may comprise any known communication network such as, a global computer network (e.g., the Internet), a wide area network (WAN), a local area network (LAN), an intranet, a satellite network, a telephone or cable network, a cellular network, a wireless network such as Wi-Fi or WiMAX, a storage fabric (e.g., IP-based or Fiber Channel storage fabric), or various portions or combinations of these and other types of networks. In this regard, the term "network" as used herein is therefore intended to be broadly construed so as to encompass a wide variety of different network arrangements, including combinations of multiple networks possibly of different types, which enable communication using, e.g., Transfer Control Protocol/Internet Protocol (TCP/IP) or other communication protocols such as Fibre Channel (FC), FC over Ethernet (FCoE), Internet Small Computer System Interface (iSCSI), Peripheral Component Interconnect express (PCIe), InfiniBand, Gigabit Ethernet, etc., to implement I/O channels and support storage network connectivity. Numerous alternative networking arrangements are possible in a given embodiment, as will be appreciated by those skilled in the art.

The data storage system 130 may comprise any type of data storage system, or a combination of data storage systems, including, but not limited to, a storage area network (SAN) system, a network attached storage (NAS) system, dynamic scale-out data storage systems, or other types of distributed data storage systems comprising software-defined storage, clustered or distributed virtual and/or physical infrastructure. The term "data storage system" as used herein should be broadly construed and not viewed as being limited to storage systems of any particular type or types. In some embodiments, the data storage system 130 comprises a dynamic scale-out data storage system which allows additional storage nodes to be added to the cluster to scale the performance and storage capacity of the data storage system 130. It is to be noted that each storage node 140 and its associated storage device array 160 is an example of what is more generally referred to herein as a "storage system" or a "storage array."

In some embodiments, each storage node 140 comprises a storage server that is implemented on, e.g., a physical server machine or storage appliance comprising hardware processors, system memory, and other hardware resources that execute software and firmware to implement the functionality of the storage node 140 and storage control system 150. In some embodiments, each storage node 140 comprises a plurality of storage control processors which execute a lightweight operating system and functional software (e.g., software-defined storage software) to implement various functions of the storage node 140 and storage control system 150, wherein such functions include, but are not limited to, (i) managing and executing data access requests issued by the host systems 110, (ii) performing various data management and storage services, and (iii) controlling network communication and connectivity with the host systems 110 and between the storage nodes 140 within the cluster, etc. In exemplary embodiments where the data storage system 130 comprises a cluster of storage nodes 140, the storage control systems 150 of the storage node cluster will communicate in a cooperative manner to process each data access request received from the host systems 110.

Further, the storage device array 160 of a given storage node 140 comprise one or more of various types of storage device such as hard-disk drives (HDDs), solid-state drives (SSDs), Flash memory cards, or other types of non-volatile memory (NVM) devices including, but not limited to, non-volatile random-access memory (NVRAM), phase-change RAM (PC-RAM), magnetic RAM (MRAM), etc. In some embodiments, the storage devices within the storage device array 160 comprise flash memory devices such as NAND flash memory, NOR flash memory, etc. The NAND flash memory can include single-level cell (SLC) devices, multi-level cell (MLC) devices, triple-level cell (TLC) devices, or quad-level cell (QLC) devices. These and various combinations of multiple different types of storage devices may be implemented in each storage node 140. In this regard, the term "storage device" as used herein should be broadly construed to encompass all types of persistent storage media including hybrid drives. On a given storage node 140, the storage control system 150 communicates with the data storage device array 160 through any suitable host interface, e.g., a host bus adapter, using suitable protocols such as Advanced Technology Attachment (ATA), serial ATA (SATA), external SATA (eSATA), parallel ATA (PATA), non-volatile memory express (NVMe), small computer system interface (SCSI), serial attached SCSI (SAS), peripheral component interconnect express (PCIe), etc.

As noted above, the data storage system 130 can implement any type of dynamic scale-out storage system in which the number of storage nodes within the storage cluster can change over time. In an exemplary embodiment, the data storage system 130 comprises a dynamic scale-out NAS system that is configured to implement a high-capacity file-level storage system architecture (e.g., for storing big data, multimedia objects, and other types of unstructured data). In other embodiments of a dynamic scale-out storage system, the data storage system 130 comprises a dynamic scale-out SAN storage system that is configured to implement a high-capacity block-level storage system architecture which consolidates the storage devices (e.g., HDDs, SSDs, PCIe or NVMe flash cards, etc.) of the storage nodes 140 into logical storage volumes (e.g., a block unit of storage management) which are identified by, e.g., logical unit numbers (LUNs). In addition, a logical storage volume can be further divided or partitioned into block units that are identified by LUNs. While the host systems 110 can communicate over a front-end network (e.g., LAN/WAN), a SAN utilizes a dedicated network (e.g., a Fibre Channel fabric, an iSCSI fabric, etc.) to provide an any-to-any connection between the host systems 110 and the storage nodes 140.

In some embodiments, the virtualization platform 114 comprises a server virtualization platform which can be implemented using, e.g., the VMware vSphere® cloud compute virtualization platform, or any suitable server virtualization platform which implements functionalities as discussed herein. The vSphere virtualization platform integrates an ESXi™ hypervisor system which is configured to create and run the virtual machines 112. The ESXi hypervisor system is a type-1 hypervisor (or bare metal hypervisor) which runs directly on the hardware of the host system 110 without an underlying operating system, while a guest operating system can run one level above the hypervisor. The ESXi system provides a virtualization layer that abstracts the processor (e.g., CPU), storage, memory and networking resources of the host system 110 into multiple virtual machines 112, wherein the applications running in virtual machines can access such resources without direct access to the underlying hardware. The hypervisor system receives requests from virtual machines 112 for resources and presents the requests to the physical hardware.

Furthermore, in some embodiments, the storage virtualization environment in FIG. 1 is implemented using the VMware vSphere® Virtual Volumes™ virtualized and software-defined storage system platform. The Virtual Volumes system is a virtual-machine centric system in which the virtual volumes 180 comprise encapsulations of virtual machine files, virtual disks, and their derivatives, clones, snapshots, and replicas, etc. The virtual volumes 180 are abstract objects that are stored in storage containers 170 in the storage device array 160. The Virtual Volumes system maps virtual disks and their derivatives, clones, snapshots, and replicas, directly to virtual volumes on the storage system, wherein such mapping allows the virtualization platform 114 to offload intensive storage operations such as snapshot, cloning, and replication to the data storage system 130.

The virtual volumes are stored natively in the data storage system 130 which is connected to the host systems 110 (e.g., ESXi hosts) through Ethernet or SAN. The virtual volumes 180 are exported as objects by the data storage system 130 and are managed entirely by hardware on the storage side. Typically, a unique GUID identifies a virtual volume. The virtual volumes 180 are not pre-provisioned, but created automatically when performing virtual machine management operations (e.g., VM creation, cloning, snapshotting, etc.) The virtualization platform 114 maps one or more virtual volumes 180 to each virtual machine 112. The virtual volumes 180 comprise virtual machine objects, which are created and stored natively in storage containers in the storage device array and mapped to virtual machine files/objects.

In particular, the virtual volumes 180 include various types of virtual volumes that are created for core elements that make up a virtual machine. For example, the virtual volumes 180 for a given virtual machine 112 include one or more "data virtual volumes" which correspond to virtual disk files, wherein a virtual disk of a given virtual machine stores the operating system, application files, and other data associated with operations of the given virtual machine. In addition, the virtual volumes for a given virtual machines include a "configuration virtual volume" which comprises a small directory that contains metadata files for the given virtual machine (e.g., descriptor files for virtual disks, log files, etc.).

The storage containers 170 are utilized to store the virtual volumes 180. The storage containers 170 and virtual volumes 180 form the virtual storage fabric. The storage containers 170 comprise logical entities which group the virtual volumes 180 for management purposes. A storage container 170 comprises a pool of raw storage capacity or an aggregation of storage capabilities that the storage system provides to the virtual volumes. The storage containers are part of the logical storage fabric and are logical units of the underlying storage capacity. The storage containers logically group virtual volumes based on management and administrative needs. For example, a storage container can contain all virtual volumes created for a tenant in a multitenant deployment, or a department in an enterprise deployment. Each storage container serves as a virtual volume store and virtual volumes are allocated out of the storage container capacity. The storage containers can be defined by a storage administrator on the storage side defines storage containers. The number of storage containers, their capacity, and their size depend on a vendor-specific implementation. A single storage container does not span different physical storage device arrays.

The host systems 110 and virtual machines 112 have no direct access to the virtual volumes 180 in the data storage system 130. Instead, the host systems 110 and virtual machines 112 utilize a logical I/O proxy, referred to as a "protocol endpoint," to communicate with the virtual volumes 180 and the virtual disk files of the virtual machines 112, which are encapsulated by the virtual volumes 180. The protocol endpoints are used to establish a data path on demand from virtual machines 112 to their respective virtual volumes 180. Each virtual volume 180 is bound to a specific protocol endpoint. When a virtual machine 112 on a given host system 110 performs an I/O operation, the protocol endpoint directs the I/O to the appropriate virtual volume 180. Typically, a storage system only needs a few protocol endpoints whereby a single protocol endpoint can connect to hundreds or thousands of virtual volumes 180.

In this regard, the virtual volumes 180 are exported to the host systems 110 through the protocol endpoints. The protocol endpoints are part of the physical storage fabric, and serve to establish data paths from the virtual machines 112 to their respective virtual volumes 180 on demand. The in-band communication between the host systems 110 and the protocol endpoints can be implemented using SCSI and NFS protocols, which provide support for virtual volumes for any type of SAN/NAS storage system which implement protocols such as iSCSI, Fibre Channel, Fibre Channel over Ethernet (FCoE), and NFS. On the storage side, the protocol endpoint configuration and QoS policy assignment module 152 is utilized by to configure protocol endpoints, one or several per storage container. The storage system exports the protocol endpoints and associated storage containers to the host system 110-1 (via a storage provider). After a storage container is mapped to a virtual volumes datastore in the virtualization platform 114, the host system 110 can discover the protocol endpoints, and mount the protocol endpoints.

A storage array used for virtual volumes exposes vendor specific storage capabilities which can be system-defined or vendor specific, e.g. capacity, performance, availability, redundancy, and so. Those capabilities are then grouped to "storage profiles." When a virtual volume is created, a storage profile is selected and assigned to the virtual volume and the virtual volume profile determines its attributes, such as whether it is created on SSD or HDD, whether encryption is turned on or off, etc. After a storage provider associated with the data storage system 130 is registered, the host systems 110 can discover all configured storage containers along with their storage capability profiles, protocol endpoints, and other attributes. A single storage container can export multiple capability profiles. As a result, virtual machines with diverse needs and different storage policy settings can be a part of the same storage container.

The virtual machines 112 which utilize the virtual volume datastores will specify a VM storage policy (alternatively referred to herein as VM storage profile). A VM storage policy is a set of rules that contains placement and quality-of-service requirements for a virtual machine. The policy enforces appropriate placement of the virtual machine within the virtual volume storage environment, and guarantees that the physical storage can satisfy the virtual machine requirements. A VM storage policies interface is utilized to create a VM storage policy. When a new VM storage policy is assigned to a virtual machine, the VM storage policy enforces that the virtual volumes storage meets the requirements.

Some storage systems provide a way to monitor and manage storage performance for I/O objects or hosts/host groups by leveraging QoS feature. This type of feature improves storage resource fairness between multiple I/O objects or groups of host systems by allowing policy-based performance goals to be configured on such objects or host groups. The configured QoS Policy is used to enforce a maximum or minimum I/O rate and burst on a specific I/O object (e.g., volume or a consistency Group) or a group of hosts. Such QoS features are used to deliver predictable performance in a consistent way or to mitigate a noisy neighbor by keeping storage resource fairness between the I/O objects or hosts/host groups.

A QoS policy defined on a QoS feature may be an individual QoS policy or a shared QoS policy. An individual QoS policy specifies a quota per registered object. The quota is enforced separately on each object. On the other hand, a shared QoS policy provides a single instance of the quota that is shared across multiple I/O objects which are registered to that QoS policy. A shared QoS policy provides an aggregate I/O quota for all the objects registered to that QoS policy. In a virtual volumes storage environment, the data storage system 130 needs to enforce QoS policy on each virtual volume associated with a given virtual machine based on the QoS level defined in the VM storage profile assigned to the given virtual machine.

Managing multiple QoS policy instances, one for each virtual volume, may consume intensive storage resources. The reason is that virtual volumes can scale to thousands and even tens of thousands virtual volumes that are stored in the data storage system 130. Existing QoS solutions provide methods for grouping volumes and such methods can be adapted to group virtual volumes. However, such conventional methods do not translate well to virtual volumes because multiple virtual volumes are accessed using a single protocol endpoint which has a single I/O queue on the application host.

More specifically, with a SCSI protocol, each LUN has a single queue on a host system per path. This queue is used to dispatch I/O requests to the storage system. The depth of the queue limits the I/O concurrency, i.e., the number of parallel I/O requests submitted to the storage system for a LUN. If I/O requests with different QoS performance levels are submitted to the same LUN, it is possible that the I/O requests for a given QoS group (e.g., Bronze), are queued due to QoS limits. Those I/O requests remain in the LUN queue until they complete, limiting the concurrency of I/O requests from other QoS performance levels which could be performed. In an extreme case, the LUN queue may be full and I/O requests from other QoS performance levels (e.g., Gold) cannot be submitted at a given time, whereby a given host system may have to resend the I/O requests to the data storage system.

Given that I/O requests associated with a lower QoS performance level remain in the LUN queue until such I/O requests are dispatched, the QoS policy enforcement becomes less flexible when distributing the bandwidth between I/O requests with different QoS performance levels. If it is desired to increase the bandwidth of a higher QoS performance level over a lower QoS performance level, the bandwidth is guaranteed only until the point where the lower QoS performance level I/O requests fill the protocol endpoint I/O dispatch queue. At this point, the I/O requests with higher QoS performance levels are unable to meet their requisite QoS performance levels (e.g., bandwidth, input/output operations per second (IOpS), I/O delay variation, burst size, or other performance metrics) until the I/O requests with a lower QoS performance level are completed, at which point the I/O requests with the higher QoS performance level can achieve their QoS performance level. This contradicts the expected behavior when setting QoS performance levels. In some cases, it may introduce I/O delay variation (DV) to the application. The term "I/O delay variation" refers to a difference in time delay between the processing of two I/O requests (with the same performance level) of an application by a storage endpoint. In other words, I/O delay variation refers to the difference in time which it takes a storage endpoint to complete the processing of two in-flight I/O requests of an application, which have the same QoS performance level. A significant time delay variation in the processing of two I/O packets with the same QoS performance level may adversely impact application performance, especially with I/O read requests.

Exemplary embodiments of the disclosure take into account the fact that a given protocol endpoint is considered, e.g., a LUN (for block storage), which has a single I/O queue on the host system, whereby all I/O requests to virtual volumes that are accessed through the given protocol endpoint are dispatched using the single I/O queue. In particular, exemplary embodiments of the disclosure provide a QoS management and enforcement platform in which QoS policies are enforced on a protocol endpoint level in the storage system instead on each virtual volume, wherein a virtual volume level of control is implemented in which a virtual volume is bound to a protocol endpoint which is determined to have an assigned QoS policy which corresponds to the QoS policy of the virtual volume (e.g., which corresponds to a storage profile of a virtual machine associated with the virtual volume). As explained in further detail below, different QoS performance levels are assigned to different protocol endpoints (e.g., different LUNs) which are associated with different I/O queues on a given host. This ensures that the I/O requests which are queued in a first I/O queue on a given host system and directed to a first protocol endpoint assigned to a first QoS performance level, do not prevent another batch of I/O requests which are queued in a second I/O queue on the given host and directed to a second protocol endpoint assigned to a second QoS performance level, from being dispatched to the storage.

Figure 2:
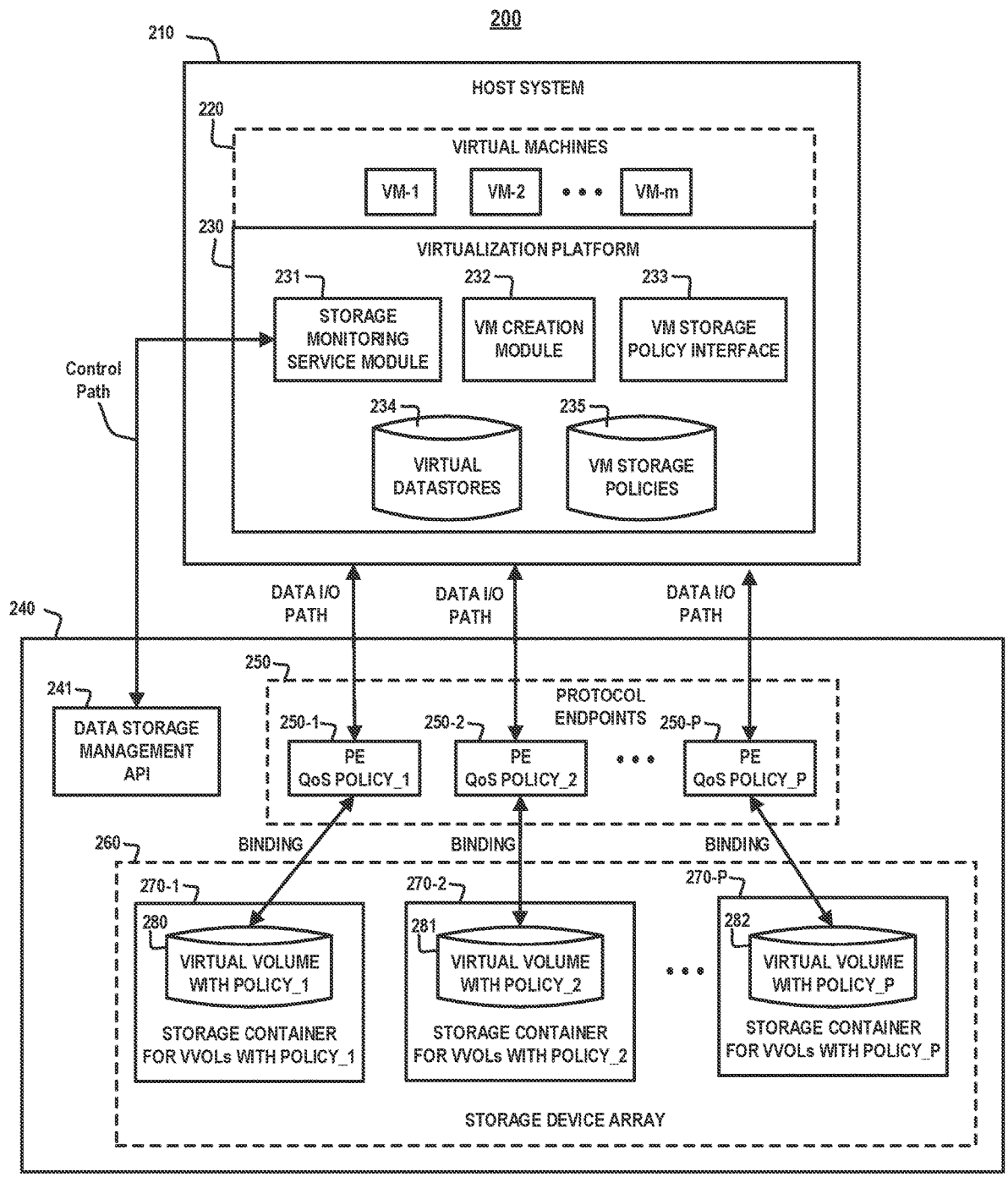
FIG. 2 schematically illustrates a run-time configuration of an information processing system which comprises a data storage system that is configured to enforce QoS polices on a protocol endpoint level in a virtual storage environment, according to an exemplary embodiment of the disclosure.

FIG. 2 schematically illustrates a run-time configuration of an information processing system which comprises a data storage system that is configured to enforce QoS polices on a protocol endpoint level in a virtual storage environment, according to an exemplary embodiment of the disclosure. In particular, FIG. 2 schematically illustrates an information processing system 200 which is based on the information processing system 100 of FIG. 1, but wherein FIG. 2 schematically illustrates further details of various system components and modules and illustrates a run-time configuration in which virtual volumes are bound to protocol endpoints to serve I/O requests that are issued by virtual machines running on a host system to access virtual volumes associated with the virtual machines.

As shown in FIG. 2, the system 200 comprises a host system 210 which comprises a plurality of virtual machines 220 that are instantiated and running in a virtual environment implemented by a virtualization platform 230. The virtualization platform 230 comprises a storage monitoring service module 231, a virtual machine creation and provisioning module 232, a virtual machine storage policy interface module 233, one or more virtual datastores 234, and a datastore comprising defined virtual machine storage policies 235. The system 200 further comprises a data storage node 240 (alternatively, data storage system 240) which comprises a data storage management API (application programming interface) 241, a plurality of protocol endpoints 250-1, 250-2, . . . , 250-P (collectively, protocol endpoints 250), and a storage device array 260. The storage device array 260 comprises a plurality of storage containers 270-1, 270-2, . . . , 270-P (collectively, storage containers 270) which store respective virtual volumes 280, 281 and 282. While FIG. 2 depicts one virtual volume stored in each of the storage containers 270 for ease of illustration, it is to be understood that each storage container can include more than one virtual volume.

The storage monitoring service module 231 (which executes in the virtualization platform 230) and the data storage management API 241 (which is a storage-side software component) communicate via an out-of-band control path. The data storage management API 241 is a storage provider module which is associated with the data storage node 240 and which integrates with the storage monitoring service module 231 to enable communication between components of the virtualization platform 230 and the data storage system (e.g., data storage node 240) to manage all aspects of the virtual volumes storage (e.g., creation of the storage containers 270 and the virtual volumes stored in the storage containers 270). The data storage management API 241 performs various functions such as mapping virtual machine files/objects (and their derivatives, such as clones, snapshots, and replicas) directly to the virtual volumes on the data storage node 240 of the data storage system.

The virtualization platform 230 utilizes the storage monitoring service module 231 to communicate with the data storage management API 241 to obtain information about available storage topology, storage capabilities, status, etc., of the physical capacity (e.g., storage device array 260) of the data storage node 240 (and other data storage nodes in the data storage system). This storage information is utilized by the virtualization platform 230 to generate virtual machine storage policies that are stored in the datastore 235. More specifically, storage capabilities of the data storage system (e.g., storage nodes) is configured and managed on the storage system by storage administrators. The storage capabilities of the given data storage system and associated storage nodes are exposed to the virtualization platform 230 by the data storage management API 241. The exposed storage capabilities are organized into a set of rules (via the VM storage policy interface module 233) which are configured to capture the QoS requirements for virtual machines and their applications, and the set of rules are stored in the datastore 235 in the form of VM storage policies. The virtual volume storage functionalities utilize VM storage policies for management related operations such as placement decision, admission control, quality of service compliance monitoring, and dynamic storage resource allocation.

Furthermore, the data storage management API 241 exposes protocol endpoints, virtual volumes, and bindings between protocol endpoints and virtual volumes in all of the storage nodes within the storage system, to the host systems, as if the protocol endpoints and virtual volumes in all the storage nodes were present in a single storage array of non-volatile data storage devices.

The virtual machine creation and provisioning module 232 is utilized to create and deploy a virtual machine to a virtual volumes datastore. When a new virtual machine is created, a VM storage policy is assigned to the virtual machine (via the VM storage policy interface module 233) to configure the virtual machine storage requirements for a virtual volumes datastore. The virtual machine creation and provisioning module 232 allows a user to select a compatible datastore which meets the storage requirements of the assigned VM storage policy.

The virtual datastores 234 correspond to storage containers 270 in the data storage node 240. In particular, each virtual datastore 234 is mapped to a corresponding storage container 270. The virtual datastore 234 represents the logical storage pool where individual virtual volumes are created and stored in a respective storage container 270 in the storage device array 260. The storage containers 270 are exported to the virtualization platform 230 by the data storage management API 241, and are mounted as virtual datastores 234 by the virtualization platform 230. The virtual datastores 234 store information regarding the virtual volumes associated with the virtual machines 220 and allows a user of the virtualization platform 230 to browse lists of virtual volumes associated with the virtual machines 220 by virtual machine name. In some embodiments, the size of a virtual volume is a multiple of a minimum predefined size (e.g., 1 MB).

In the data storage node 240, the QoS policies of the virtual machines 220 are enforced on the level of the protocol endpoints 250 whereby each protocol endpoint 250 is assigned to a different QoS policy. In particular, as shown in FIG. 2, the protocol endpoints 250-1, 250-2, . . . , 250-P are assigned to a respective one of P different QoS policies, e.g., QoS Policy_1, QoS Policy_2, . . . , QoS Policy_P. In the exemplary embodiment of FIG. 2, it is assumed that the protocol endpoints 250 are configured and instantiated using the protocol endpoint configuration and QoS policy assignment module 152 (FIG. 1). In some embodiments, the data storage node 240 maintains a plurality of protocol endpoints per host system 210 or host cluster, wherein each protocol endpoint is associated with a different QoS policy. In some embodiments, the QoS policies are exposed as storage capabilities to the virtualization platform 230 and are made available for use in the VM storage policies 235 that are assigned to virtual machines.

When a given virtual machine 220 is provisioned in the host system 210, the virtual volumes that are created by the data storage node 240 to store the objects of the given virtual machine are assigned a QoS policy which corresponds to the QoS policy defined by the VM storage policy assigned to the given virtual machine. Further, in some embodiments, such as shown in FIG. 2, the storage containers 270 are configured such that each storage container 270-1, 270-2, . . . , 270-P groups virtual volumes having the same QoS policy. For example, the storage container 270-1 is configured to store virtual volumes (e.g., virtual volume 280) with a QoS Policy_1, the storage container 270-2 is configured to store virtual volumes (e.g., virtual volume 281) with a QoS Policy_2, and the storage container 270-P is configured to store virtual volumes (e.g., virtual volume 282) with a QoS Policy_P.

When a given virtual machine 220 requests access to a target virtual volume associated with the given virtual machine, the target virtual volume is automatically bound to a protocol endpoint 250 which is determined to have an assigned QoS policy which corresponds to the QoS policy of the target virtual volume associated with the given virtual machine. In this configuration, instead of enforcing the QoS policy on each virtual volume, the QoS policy enforcement is on the protocol endpoint level. In this regard, since the protocol endpoint can serve thousands and even tens of thousands virtual volumes, enforcement of the QoS policy enforcement on the protocol endpoint level reduces consumption of storage resources as compared to enforcement of the QoS policy on each virtual volume. The QoS enforcement at the protocol endpoint level requires finer granularity compared to host level enforcement, but provides lower granularity as compared to QoS enforcement on the virtual volumes level.

In some embodiments, the number of possible QoS performance levels is determined based on the available resources of the data storage node 240. For example, in some embodiments, the QoS performance levels include at least three different QoS performance levels, e.g., Gold, Silver, and Bronze, or more than three levels. By way of example, a "Gold" QoS performance level may specify a 10 IOpS performance level, a "Silver" QoS performance level may specify a 4 IOpS performance level, and a "Bronze" QoS performance level may specify a 2 IOpS performance level. It is to be understood that the terms Gold, Silver, and Bronze as used herein are broadly meant to denote different QoS performance levels which can be related to one or more of the different performance metrics as discussed herein (e.g., IOpS, bandwidth, delay variation, burst size, etc.). As noted above, when creating a virtual machine, a user associates a storage profile with the virtual machines such that all virtual volumes that are created for the given virtual machine are associated with the storage profile assigned to virtual machines, wherein the storage profile would include, among other storage capabilities, the selected QoS policy.

In some embodiments, a QoS policy specifies a performance level of storage input/output throughput. With regard to a virtual machine, QoS policy may specify a minimum I/O performance level that the virtual machine requires for executing is applications or workloads. For example, such I/O performance level can be specified as IOpS, an input/output data transfer rate (e.g., bandwidth in terms of megabytes/s (MB/s, gigabytes/s GB/s, etc.), I/O delay variation, burst size, or other performance level metrics. With regard to a protocol endpoint, the QoS policy assigned to a given protocol endpoint may specify a maximum I/O performance level (e.g., shared performance) that a virtual machine or host system can expect to obtain through the protocol endpoint that is bound to a target virtual volume of the virtual machine. In some embodiments, the QoS performance levels that are assigned to the protocol endpoints are based on the storage capabilities of the storage nodes which are reported by the data storage management API 241.

In some embodiments, the host system 210 (and other host systems 110, FIG. 1) would be assigned several protocol endpoints 250, where each protocol endpoint is assigned a different one of a plurality (P) of different QoS policies. There are various methods that may be implemented to create protocol endpoints and assign QoS policies to the protocol endpoints. For example, in some embodiments, the protocol endpoints 250 can be created and assigned QoS policies before virtual volumes are created and stored in the storage containers 270 in the storage device array 260. Further, in some embodiments, when a virtual volume for a given virtual machine is created with a specific QoS policy profile, and there is no protocol endpoint with an assigned QoS policy which matches the specific QoS policy profile of the virtual volume, the data storage node 240 can automatically create a new protocol endpoint, and assign the specific QoS policy profile to the newly created protocol endpoint. In other embodiments, when a host system is added to the system, the host can be assigned to a set of QoS policies, wherein the data storage node 240 creates the requisite set of protocol endpoints for the assigned set of QoS policies—one protocol endpoint for each QoS policy in the set of QoS policies. In all instances, when access to a target virtual volume is requested by the host system (e.g., a virtual machine executing on the host system), the data storage system will bind the target virtual volume to the protocol endpoint having a QoS performance level which matches the QoS performance level in VM storage profile associated with the virtual volume.

The protocol endpoint level QoS management and enforcement techniques as described herein allows the user to assign QoS policy at a virtual volumes granularity without the system actually having to manage and enforce QoS policies as the level of virtual volumes. Indeed, in the exemplary system 200 shown in FIG. 2, the maximum number of storage objects for which the system needs to enforce QoS policies does not exceed number of hosts X number of QoS performance levels. In this regard, managing the QoS policies for a small number of protocol endpoints requires far less system resources as compared to the amount of system resources needed to individually manage the QoS policies for thousands of virtual volumes. While the exemplary QoS policy management and enforcement techniques as described herein do not provide the fine granularity management as a per-virtual volume QoS policy would allow, they still provide an almost identical control while using far fewer resources.

In some embodiments, the QoS policy type used at the level of the protocol endpoint is a shared QoS policy where a QoS quota (e.g., IOpS or bandwidth (e.g., MBpS)) of a given protocol endpoint is shared between the virtual volumes that are bound to the given protocol endpoint. The shared QoS policy may result in a situation such as "noisy" storage object or a storage object with I/O bursts which cannot be properly served when, e.g., the storage object is not receiving enough granted credits in a given time allowing the system QoS policy instance to serve the burst. In some embodiments, the data storage system would be configured to identify such cases, and then determine whether to automatically rebind the virtual volume to a different existing protocol endpoint with a suitable QoS policy or, in some cases, create a new protocol endpoint with an assigned QoS policy to provide access by a virtual machine to the virtual volume. In some embodiments, rebinding the virtual volume to a different protocol endpoint (e.g., an existing or new protocol endpoint) can be performed manually by a system administrator in response to, e.g., notifications provided to the system administrator by the data storage system with regard to a given protocol endpoint not providing its expected QoS performance level. There are ways to identify such virtual volumes by periodically monitoring the rate and performance on virtual volumes level and take action when the rate or performance exceeds reasonable thresholds.

Figure 3:
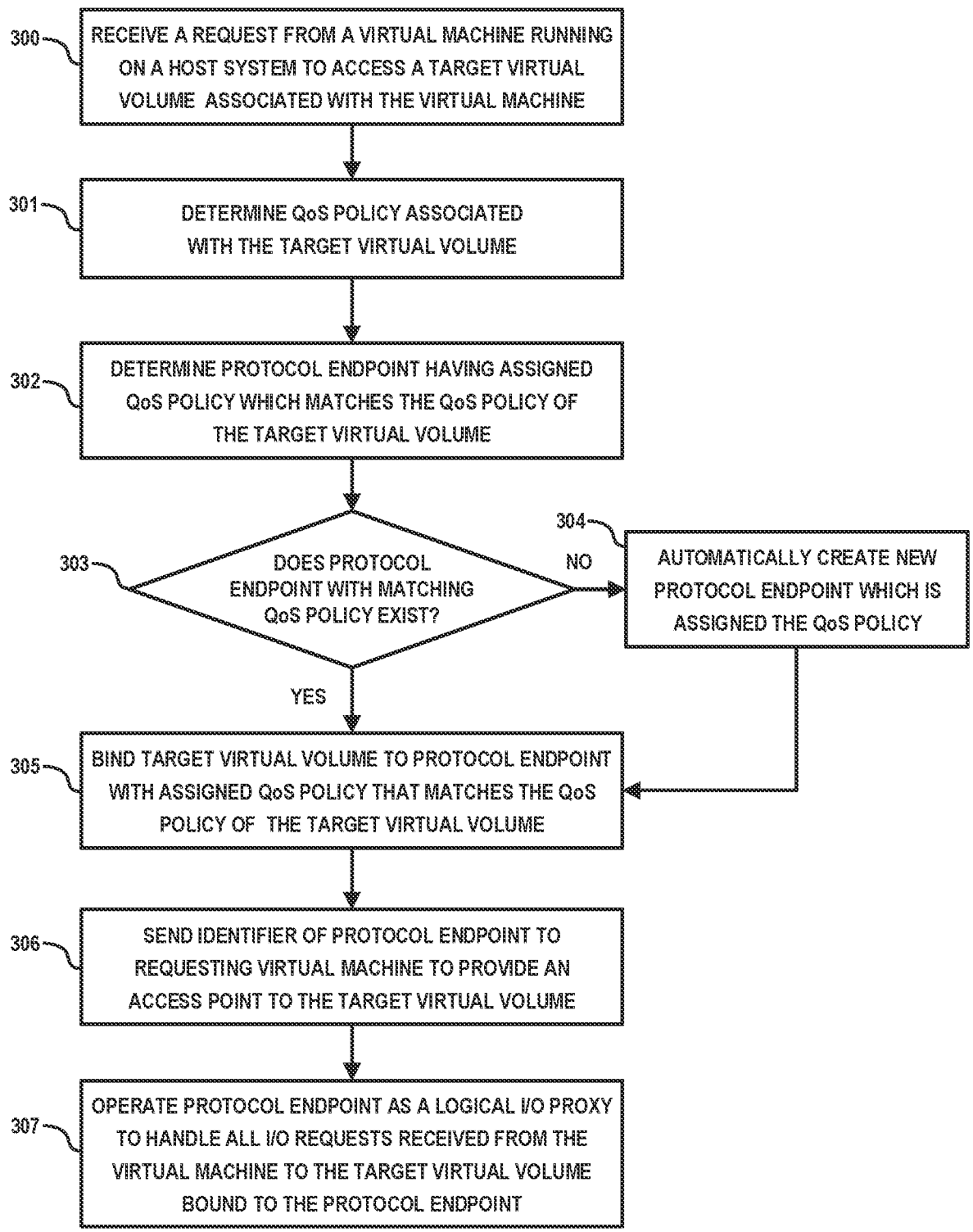
FIG. 3 is a flow diagram of a method for enforcing QoS polices on a protocol endpoint level in a virtual storage environment, according to an exemplary embodiment of the disclosure.

FIG. 3 is a flow diagram of a method for enforcing QoS polices on a protocol endpoint level in a virtual storage environment, according to an exemplary embodiment of the disclosure. In some embodiments, FIG. 3 illustrates exemplary modes of operation of the storage environment shown in FIG. 2, and thus, the flow diagram of FIG. 3 will be discussed in the context of the exemplary system configuration shown in FIG. 2. When a virtual machine 220 executing in the host system 210 requests access to a target virtual volume stored in a given storage container 270 in the storage device array 260, the host system 210 will send a request to the data storage system 240 for connecting to the target virtual volume in the storage device array 260 of the data storage system 240, which request is received by the data storage system 240 (block 300).

In response to the received request, the data storage system 240 will determine a QoS policy that is associated with the target virtual volume (block 301). In some embodiments, noted above, the QoS policy that is associated with the target virtual volume is determined from the VM storage policy which is assigned to the virtual machine requesting access to the target virtual volume. The VM storage policy associated with the virtual machine will specify a QoS policy that is to be applied to virtual volumes that are created for the virtual machine and stored in a storage container 270 in the storage device array 260. After determining the QoS policy associated with the target virtual volume, the data storage system 240 will determine a protocol endpoint which has an assigned quality QoS policy which corresponds to the determined QoS policy of the target virtual volume (block 302). In some embodiments, this determination is made by determining which protocol endpoint, which is included in the set of existing protocol endpoints 250 associated with the host system 210, has an assigned QoS policy that corresponds to the QoS policy of the target virtual volume. The protocol endpoint having the corresponding QoS policy will be selected from the set of protocol endpoints 250. In other embodiments, if the data storage system 240 determines that the set of protocol endpoints 250 for the host system 210 does not include a protocol endpoint with an assigned QoS policy which corresponds to the QoS policy of the target virtual volume (negative determination in block 303), the data storage system automatically creates a new protocol endpoint with an assigned QoS policy which corresponds to the QoS policy of the target virtual volume (block 304).

Once a target endpoint is identified or otherwise created (blocks 302 or 304), the data storage system will bind the target virtual volume to the target protocol endpoint which has an assigned QoS policy which corresponds to the QoS policy of the target virtual volume (block 305). For instance, as shown in FIG. 2, the virtual volume 280 with QoS Policy_1 is bound to the protocol endpoint 250-1 which is assigned the corresponding QoS Policy_1, and the virtual volume 281 with QoS Policy_2 is bound to the protocol endpoint 250-2 which is assigned the corresponding QoS Policy_2, etc.

The data storage system 240 will then send to the host system 210 a unique identifier of the protocol endpoint which is bound to the target virtual volume (block 306). For example, in some embodiments, the unique identifier (ID) of the protocol endpoint can be, e.g., a logical unit number (LUN), a World Wide Name (WWN), an Internet Protocol (IP) address, or some other type of identifier or address, that can be used by the host system 210 to direct I/O requests to the protocol endpoint which is bound to the target virtual volume. In this instance, the unique ID of the protocol endpoint becomes an access point to the target virtual volume, wherein the protocol endpoint operates as a logical I/O proxy to accept and handle all I/O requests (which are received from the virtual machine) to the target virtual volume bound to the protocol endpoint (block 307). This binding exists until, e.g., the host system 210 sends an unbind request for the target virtual volume.

As shown in FIG. 2, the host system 210 can communicate with each of the protocol endpoints 250 over different data paths between the host system 210 and the respective protocol endpoints 250-1, 250-2, . . . , 250-P. The host system 210 sends I/O requests (issued by the virtual machines 220) over the respective data paths to the protocol endpoints that are bound to target virtual volumes to which the I/O requests are directed. The data path for a virtual volume may span one or more communication networks, such as the Internet, a LAN, and/or a SAN. In some embodiments, the host system 210 comprises a separate I/O queue for each individual protocol endpoint which is assigned to service the host system 210.

Figure 4:
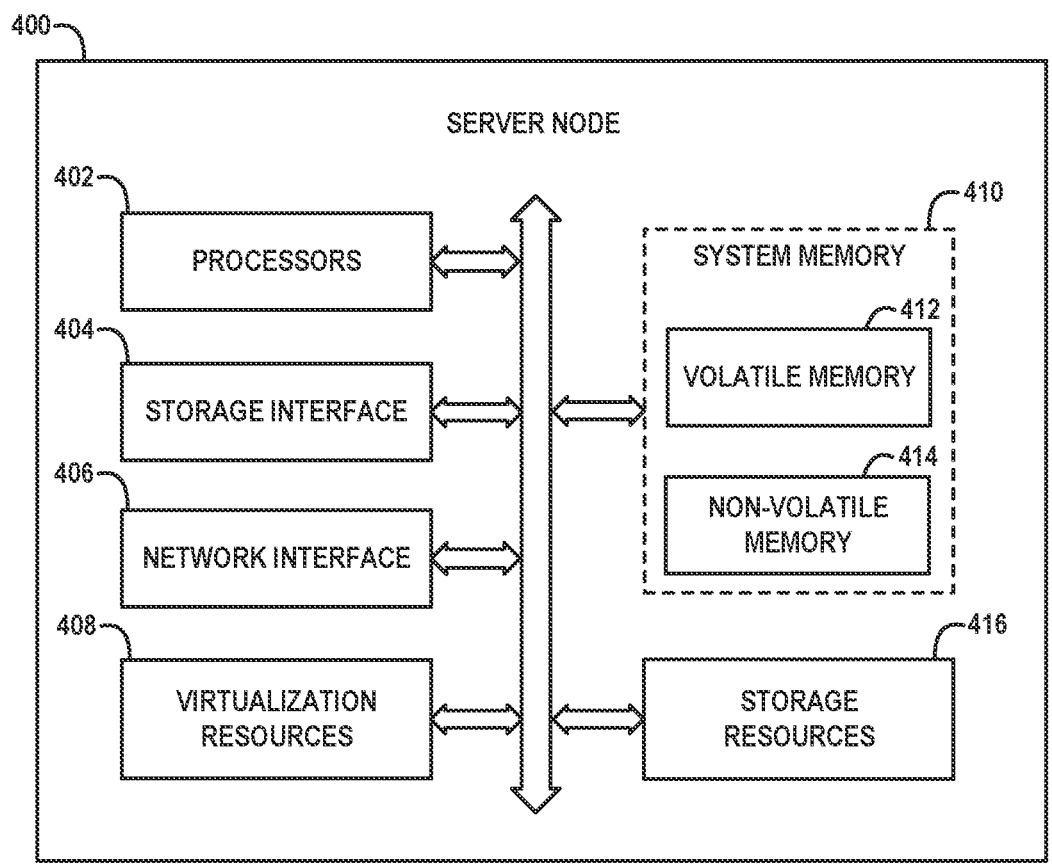
FIG. 4 schematically illustrates a framework of a server node which can implement a system that is configured to enforce QoS polices on a protocol endpoint level in a virtual storage environment, according to an exemplary embodiment of the disclosure.

FIG. 4 schematically illustrates a framework of a server node which can implement a system that is configured to enforce QoS polices on a protocol endpoint level in a virtual storage environment, according to an exemplary embodiment of the disclosure. In some embodiments, FIG. 4 illustrates an exemplary embodiment of a data storage server node (e.g., storage node 140 (FIG. 1) or data storage system 240 (FIG. 2)), or a host system (e.g., host system 110, FIG. 1 and host system 210, FIG. 2). The server node 400 comprises processors 402, storage interface circuitry 404, network interface circuitry 406, virtualization resources 408, system memory 410, and storage resources 416. The system memory 410 comprises volatile memory 412 and non-volatile memory 414. The processors 402 comprise one or more types of hardware processors that are configured to process program instructions and data to execute a native operating system (OS) and applications that run on the server node 400.

For example, the processors 402 may comprise one or more CPUs, microprocessors, microcontrollers, application specific integrated circuits (ASICs), field programmable gate arrays (FPGAs), and other types of processors, as well as portions or combinations of such processors. The term "processor" as used herein is intended to be broadly construed so as to include any type of processor that performs processing functions based on software, hardware, firmware, etc. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, graphics processing units (GPUs), digital signal processors (DSPs), system-on-chip (SoC), tensor processing units (TPUs), image processing units (IPUs), deep learning accelerators (DLAs), artificial intelligence (AI) accelerators, and other types of specialized processors or coprocessors that are configured to execute one or more fixed functions.

The storage interface circuitry 404 enables the processors 402 to interface and communicate with the system memory 410, the storage resources 416, and other local storage and off-infrastructure storage media, using one or more standard communication and/or storage control protocols to read data from or write data to volatile and non-volatile memory/storage devices. Such protocols include, but are not limited to, NVMe, PCIe, PATA, SATA, SAS, Fibre Channel, etc. The network interface circuitry 406 enables the server node 400 to interface and communicate with a network and other system components. The network interface circuitry 406 comprises network controllers such as network cards and resources (e.g., network interface controllers (NICs) (e.g., SmartNICs, RDMA-enabled NICs), Host Bus Adapter (HBA) cards, Host Channel Adapter (HCA) cards, I/O adaptors, converged Ethernet adaptors, etc.) to support communication protocols and interfaces including, but not limited to, PCIe, DMA and RDMA data transfer protocols, etc.

The virtualization resources 408 can be instantiated to execute one or more services or functions which are hosted by the server node 400. For example, the virtualization resources 408 can be configured to implement the various modules and functionalities of a host connectivity management system as discussed herein. In one embodiment, the virtualization resources 408 comprise virtual machines that are implemented using a hypervisor platform which executes on the server node 400, wherein one or more virtual machines can be instantiated to execute functions of the server node 400. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer.

A hypervisor is an example of what is more generally referred to as "virtualization infrastructure." The hypervisor runs on physical infrastructure, e.g., CPUs and/or storage devices, of the server node 400, and emulates the CPUs, memory, hard disk, network and other hardware resources of the host system, enabling multiple virtual machines to share the resources. The hypervisor can emulate multiple virtual hardware platforms that are isolated from each other, allowing virtual machines to run, e.g., Linux and Windows Server operating systems on the same underlying physical host. The underlying physical infrastructure may comprise one or more commercially available distributed processing platforms which are suitable for the target application.

In another embodiment, the virtualization resources 408 comprise containers such as Docker containers or other types of Linux containers (LXCs). As is known in the art, in a container-based application framework, each application container comprises a separate application and associated dependencies and other components to provide a complete filesystem, but shares the kernel functions of a host operating system with the other application containers. Each application container executes as an isolated process in user space of a host operating system. In particular, a container system utilizes an underlying operating system that provides the basic services to all containerized applications using virtual-memory support for isolation. One or more containers can be instantiated to execute one or more applications or functions of the server node 400 as well execute one or more of the various modules and functionalities as discussed herein. In yet another embodiment, containers may be used in combination with other virtualization infrastructure such as virtual machines implemented using a hypervisor, wherein Docker containers or other types of LXCs are configured to run on virtual machines in a multi-tenant environment.

In some embodiments, the various components of the virtualization platforms and storage control systems shown in FIGS. 1 and 2 comprise program code that is loaded into the system memory 410 (e.g., volatile memory 412), and executed by the processors 402 to perform respective functions as described herein. In this regard, the system memory 410, the storage resources 416, and other memory or storage resources as described herein, which have program code and data tangibly embodied thereon, are examples of what is more generally referred to herein as "processor-readable storage media" that store executable program code of one or more software programs. Articles of manufacture comprising such processor-readable storage media are considered embodiments of the disclosure. An article of manufacture may comprise, for example, a storage device such as a storage disk, a storage array or an integrated circuit containing memory. The term "article of manufacture" as used herein should be understood to exclude transitory, propagating signals.

The system memory 410 comprises various types of memory such as volatile RAM, NVRAM, or other types of memory, in any combination. The volatile memory 412 may be a dynamic random-access memory (DRAM) (e.g., DRAM DIMM (Dual In-line Memory Module), or other forms of volatile RAM. The non-volatile memory 414 may comprise one or more of NAND Flash storage devices, SSD devices, or other types of next generation non-volatile memory (NGNVM) devices. The system memory 410 can be implemented using a hierarchical memory tier structure wherein the volatile system memory 412 is configured as the highest-level memory tier, and the non-volatile system memory 414 (and other additional non-volatile memory devices which comprise storage-class memory) is configured as a lower level memory tier which is utilized as a high-speed load/store non-volatile memory device on a processor memory bus (i.e., data is accessed with loads and stores, instead of with I/O reads and writes). The term "memory" or "system memory" as used herein refers to volatile and/or non-volatile memory which is utilized to store application program instructions that are read and processed by the processors 402 to execute a native operating system and one or more applications or processes hosted by the server node 400, and to temporarily store data that is utilized and/or generated by the native OS and application programs and processes running on the server node 400. The storage resources 416 can include one or more HDDs, SSD storage devices, etc.

It is to be understood that the above-described embodiments of the disclosure are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of such embodiments. Numerous other alternative embodiments within the scope of the appended claims will be readily apparent to those skilled in the art.

What is claimed is:

1. A method, comprising:
    assigning, by a data storage system, quality of service (QoS) policies to respective protocol endpoints of a plurality of protocol endpoints that are configured by the data storage system;
    receiving, by the data storage system, a request from a host system to connect to a target virtual volume in a storage array of the data storage system;
    determining, by the data storage system, a QoS policy associated with the target virtual volume;
    determining, by the data storage system, whether there exists a protocol endpoint which has an assigned QoS policy which corresponds to the QoS policy associated with the target virtual volume; and
    in response to determining that a protocol endpoint having an assigned QoS policy corresponding to the QoS policy associated with the target virtual volume does not exist:
        automatically creating, by the data storage system, a new protocol endpoint having an assigned QoS policy which corresponds to the QoS policy associated with the target virtual volume;
        binding, by the data storage system, the target virtual volume to the new protocol endpoint;
        sending, by the data storage system, a unique identifier of the new protocol endpoint, which is bound to the target virtual volume, to the host system; and
        utilizing, by the data storage system, the new protocol endpoint, which is bound to the target virtual volume, as a logical input/output proxy that is configured to handle data access requests received from the host system for accessing the target virtual volume.

2. The method of claim 1, wherein in response to determining that a protocol endpoint having an assigned QoS policy corresponding to the QoS policy associated with the target virtual volume does exist:
    selecting, by the data storage system, an existing protocol endpoint from the plurality of protocol endpoints, which is determined to have an assigned QoS policy which corresponds to the QoS policy associated with the target virtual volume;
    binding, by the data storage system, the selected protocol endpoint to the target virtual volume;
    sending, by the data storage system, a unique identifier of the selected protocol endpoint, which is bound to the target virtual volume, to the host system; and
    utilizing, by the data storage system, the selected protocol endpoint, which is bound to the target virtual volume, as a logical input/output proxy that is configured to handle data access requests received from the host system for accessing the target virtual volume.

3. The method of claim 1, wherein the host system comprises a virtual machine and wherein the QoS policy associated with the target virtual volume is specified in a storage policy associated with the virtual machine.

4. The method of claim 1, wherein a given QoS policy assigned to a given protocol endpoint specifies a performance level of storage input/output throughput.

5. The method of claim 4, wherein the performance level of storage input/output throughput is specified as one of input/output operations per second and an input/output data transfer rate.

6. The method of claim 4, wherein the given QoS policy assigned to the given protocol endpoint comprises a shared QoS policy in which the specified performance level of storage throughput is shared between a plurality of virtual volumes that are bound to the given protocol endpoint.

7. The method of claim 1, further comprising, rebinding, by the data storage system, the target virtual volume to another protocol endpoint which is determined to have an assigned QoS policy which corresponds to the QoS policy associated with the target virtual volume, in response to determining that the host system is not receiving an expected performance level of storage input/output throughput as specified by the QoS policy associated with the target virtual volume.

8. An article of manufacture comprising a non-transitory processor-readable storage medium having stored therein program code of one or more software programs, wherein the program code is executable by one or more processors to implement a method which comprises:
assigning, by a data storage system, quality of service (QoS) policies to respective protocol endpoints of a plurality of protocol endpoints that are configured by the data storage system;
receiving, by the data storage system, a request from a host system to connect to a target virtual volume in a storage array of the data storage system;
determining, by the data storage system, a QoS policy associated with the target virtual volume;
determining, by the data storage system, whether there exists a protocol endpoint which has an assigned QoS policy which corresponds to the QoS policy associated with the target virtual volume; and
in response to determining that a protocol endpoint having an assigned QoS policy corresponding to the QoS policy associated with the target virtual volume does not exist:
automatically creating, by the data storage system, a new protocol endpoint having an assigned QoS policy which corresponds to the QoS policy associated with the target virtual volume;
binding, by the data storage system, the target virtual volume to the new protocol endpoint;
sending, by the data storage system, a unique identifier of the new protocol endpoint, which is bound to the target virtual volume, to the host system; and
utilizing, by the data storage system, the new protocol endpoint, which is bound to the target virtual volume, as a logical input/output proxy that is configured to handle data access requests received from the host system for accessing the target virtual volume.

9. The article of manufacture of claim 8, wherein in response to determining that a protocol endpoint having an assigned QoS policy corresponding to the QoS policy associated with the target virtual volume does exist, further comprising program code which is executable by the one or more processors to implement a method which comprises:
selecting, by the data storage system, an existing protocol endpoint from the plurality of protocol endpoints, which is determined to have an assigned QoS policy which corresponds to the QoS policy associated with the target virtual volume;
binding, by the data storage system, the selected protocol endpoint to the target virtual volume;
sending, by the data storage system, a unique identifier of the selected protocol endpoint, which is bound to the target virtual volume, to the host system; and
utilizing, by the data storage system, the selected protocol endpoint, which is bound to the target virtual volume, as a logical input/output proxy that is configured to handle data access requests received from the host system for accessing the target virtual volume.

10. The article of manufacture of claim 8, wherein the host system comprises a virtual machine and wherein the QoS policy associated with the target virtual volume is specified in a storage policy associated with the virtual machine.

11. The article of manufacture of claim 8, wherein a given QoS policy assigned to a given protocol endpoint specifies a performance level of storage input/output throughput.

12. The article of manufacture of claim 11, wherein the performance level of storage input/output throughput is specified as one of input/output operations per second and an input/output data transfer rate.

13. The article of manufacture of claim 11, wherein the given QoS policy assigned to the given protocol endpoint comprises a shared QoS policy in which the specified performance level of storage throughput is shared between a plurality of virtual volumes that are bound to the given protocol endpoint.

14. The article of manufacture of claim 8, further comprising program code which is executable by the one or more processors to implement a method which comprises rebinding, by the data storage system, the target virtual volume to another protocol endpoint which is determined to have an as signed QoS policy which corresponds to the QoS policy associated with the target virtual volume, in response to determining that the host system is not receiving an expected performance level of storage input/output throughput as specified by the QoS policy associated with the target virtual volume.

15. A system, comprising:
a data storage system comprising at least one data storage node which comprises a storage array that comprises one or more virtual volumes;
wherein the at least one data storage node comprises at least one processor, and a system memory configured to store program code, wherein the program code is executable by the at least one processor to implement a storage control system on the data storage node which is configured to:
assign quality of service (QoS) policies to respective protocol endpoints of a plurality of protocol endpoints that are configured by the data storage system;
receive a request from a host system to connect to a target virtual volume in a storage array of the data storage system;
determine a QoS policy associated with the target virtual volume;
determine whether there exists a protocol endpoint which has an assigned QoS policy which corresponds to the QoS policy associated with the target virtual volume; and
in response to determining that a protocol endpoint having an assigned QoS policy corresponding to the QoS policy associated with the target virtual volume does not exist, the storage control system is configured to:
- automatically create a new protocol endpoint having an assigned QoS policy which corresponds to the QoS policy associated with the target virtual volume;
- bind the target virtual volume to the new protocol endpoint;
- send a unique identifier of the new protocol endpoint, which is bound to the target virtual volume, to the host system; and
- utilize the new protocol endpoint, which is bound to the target virtual volume, as a logical input/output proxy that is configured to handle data access requests received from the host system for accessing the target virtual volume.

16. The system of claim 15, wherein in response to determining that a protocol endpoint having an assigned QoS policy corresponding to the QoS policy associated with the target virtual volume does exist, the storage control system is configured to:
- select an existing protocol endpoint from the plurality of protocol endpoints, which is determined to have an assigned QoS policy which corresponds to the QoS policy associated with the target virtual volume;
- bind the selected protocol endpoint to the target virtual volume;
- send a unique identifier of the selected protocol endpoint, which is bound to the target virtual volume, to the host system; and
- utilize the selected protocol endpoint, which is bound to the target virtual volume, as a logical input/output proxy that is configured to handle data access requests received from the host system for accessing the target virtual volume.

17. The system of claim 15, wherein:
- a given QoS policy assigned to a given protocol endpoint specifies a performance level of storage input/output throughput; and
- the performance level of storage input/output throughput is specified as one of input/output operations per second and an input/output data transfer rate.

18. The system of claim 17, wherein the given QoS policy assigned to the given protocol endpoint comprises a shared QoS policy in which the specified performance level of storage throughput is shared between a plurality of virtual volumes that are bound to the given protocol endpoint.

19. The system of claim 15, wherein the host system comprises a virtual machine and wherein the QoS policy associated with the target virtual volume is specified in a storage policy associated with the virtual machine.

20. The system of claim 15, wherein the storage control system is further configured to automatically rebind the target virtual volume to another protocol endpoint which is determined to have an assigned QoS policy which corresponds to the QoS policy associated with the target virtual volume, in response to determining that the host system is not receiving an expected performance level of storage input/output throughput as specified by the QoS policy associated with the target virtual volume.

* * * * *